(12) United States Patent
Shin

(10) Patent No.: US 8,604,381 B1
(45) Date of Patent: Dec. 10, 2013

(54) INTEGRATED LASER MATERIAL PROCESSING CELL

(75) Inventor: Yung C. Shin, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 1335 days.

(21) Appl. No.: 11/871,664

(22) Filed: Oct. 12, 2007

Related U.S. Application Data

(60) Provisional application No. 60/851,165, filed on Oct. 12, 2006.

(51) Int. Cl.
*B23K 26/34* (2006.01)

(52) U.S. Cl.
USPC .................................. 219/121.64; 219/121.76

(58) Field of Classification Search
USPC ............... 219/121.63–121.66, 121.76; 72/47, 72/342.94; 118/695, 596; 700/98, 700/118–120, 159, 166
See application file for complete search history.

(56) References Cited

U.S. PATENT DOCUMENTS

| | | | |
|---|---|---|---|
| 2,600,463 A | 6/1952 | Weingard | |
| 2,654,821 A | 6/1953 | Gillett | |
| 3,290,966 A * | 12/1966 | Gesko | 408/16 |
| 3,587,367 A | 6/1971 | Dotson | |
| 4,229,640 A | 10/1980 | Longo | |
| 4,352,973 A | 10/1982 | Chase | |
| 4,356,376 A | 10/1982 | Komanduri et al. | |
| 4,459,458 A | 7/1984 | Vetsch et al. | |
| 4,623,777 A * | 11/1986 | Aihara et al. | 219/121.6 |
| 4,733,049 A | 3/1988 | Lemelson | |
| 4,743,733 A * | 5/1988 | Mehta et al. | 219/121.66 |
| 4,749,840 A | 6/1988 | Piwczyk | |
| 4,857,697 A | 8/1989 | Melville | |
| 4,925,523 A | 5/1990 | Braren et al. | |
| 5,208,431 A * | 5/1993 | Uchiyama et al. | 219/121.65 |
| 5,256,851 A | 10/1993 | Presby | |
| 5,398,193 A * | 3/1995 | deAngelis | 700/119 |
| 5,653,021 A * | 8/1997 | Matsuyama et al. | 29/888.049 |
| 5,698,121 A | 12/1997 | Kosaka et al. | |
| 5,768,137 A * | 6/1998 | Polidoro et al. | 700/186 |
| 5,837,960 A | 11/1998 | Lewis et al. | |
| 5,849,371 A | 12/1998 | Beesley | |
| 5,859,405 A | 1/1999 | Golz et al. | |
| 5,906,459 A | 5/1999 | Thomas et al. | |

(Continued)

OTHER PUBLICATIONS

Kincade, K., untitled, LaserFocusWorld, c. May 2005, 5 pages.

(Continued)

*Primary Examiner* — Samuel M Heinrich
(74) *Attorney, Agent, or Firm* — Maginot, Moore & Beck

(57) ABSTRACT

An integrated laser material processing cell allowing laser-assisted machining to be used in conjunction with directed material deposition in a single setup, achieving greater geometric accuracy and better surface finish than currently possible in existing laser freeform fabrication techniques. The integration of these two processes takes advantage of their common use of laser beam heat to process materials. The cell involves a multi-axis laser-assisted milling machine having a work spindle, a laser emitter, and means for positioning the emitter with respect to the spindle so as to direct a laser beam onto a localized area of a workpiece in proximity to a cutting tool mounted in the spindle. A powder delivery nozzle mounted on the machine and positioned adjacent to the emitter delivers powder to a deposition zone in the path of the beam, such that material deposition and laser-assisted milling may be performed substantially simultaneously in a single workspace.

5 Claims, 6 Drawing Sheets

(56) References Cited

U.S. PATENT DOCUMENTS

| | | | |
|---|---|---|---|
| 6,122,564 | A | 9/2000 | Koch et al. |
| 6,218,642 | B1 | 4/2001 | Christmas et al. |
| 6,391,251 | B1 | 5/2002 | Keicher et al. |
| 6,393,687 | B1 | 5/2002 | Friedrich |
| 6,410,105 | B1 | 6/2002 | Mazumder et al. |
| 6,653,210 | B2 | 11/2003 | Choo et al. |
| 6,666,630 | B2 * | 12/2003 | Zimmermann et al. ...... 409/132 |
| 6,811,744 | B2 | 11/2004 | Keicher et al. |
| 6,859,681 | B1 | 2/2005 | Alexander |
| 6,888,853 | B1 * | 5/2005 | Jurgensen .......................... 372/6 |
| 7,002,100 | B2 | 2/2006 | Wu et al. |
| 7,045,738 | B1 * | 5/2006 | Kovacevic et al. ....... 219/121.63 |
| 7,626,136 | B2 * | 12/2009 | Sato et al. ................ 219/121.63 |
| 2001/0002287 | A1 * | 5/2001 | Kar et al. ....................... 427/554 |
| 2003/0066822 | A1 | 4/2003 | Kusnezow |
| 2004/0173590 | A1 | 9/2004 | Hata et al. |
| 2004/0206734 | A1 | 10/2004 | Horsting |
| 2005/0006361 | A1 | 1/2005 | Kobayashi et al. |
| 2005/0029330 | A1 * | 2/2005 | Kohn .......................... 228/112.1 |
| 2005/0173380 | A1 * | 8/2005 | Carbone ................. 219/121.31 |

OTHER PUBLICATIONS

Lei, S. et al., "Deformation Mechanisms and Constitutive Modeling for Silicon Nitride Undergoing Laser-Assisted Machining," *International Journal of Machine Tools & Manufacture*, vol. 40, No. 15, Dec. 2000, pp. 2213-2233.

Lei, S. et al., "Experimental Investigation of Thermo-Mechanical Characteristics in Laser-Assisted Machining of Silicon Nitride Ceramics," *Journal of Manufacturing Science and Engineering*, vol. 123, Nov. 2001, pp. 639-646.

Pfefferkorn, F. et al., "Laser-Assisted Machining of Magnesia-Partially-Stabilized Zirconia," *Journal of Manufacturing Science and Engineering*, vol. 126, No. 1, Feb. 2004, pp. 42-51.

Rebro, P. A. et al., "Design of Operating Conditions for Crackfree Laser-Assisted Machining of Mullite," *International Journal of Machine Tools & Manufacture*, vol. 44, No. 7-8, Jun. 2004, pp. 677-694.

Rebro, P. A. et al., "Laser-Assisted Machining of Reaction Sintered Mullite Ceramics," *Journal of Manufacturing Science and Engineering*, vol. 124, Nov. 2002, pp. 875-885.

Rebro, P.A. et al., "Comparative Assessment of Laser-Assisted Machining for Various Ceramics," *30th North American Manufacturing Research Conference*, May 21-24, 2002, West Lafayette, Indiana, 10 pgs.

Rozzi, J. C. et al., "Experimental Evaluation of the Laser Assisted Machining of Silicon Nitride Ceramics," *Journal of Manufacturing Science and Engineering*, vol. 122, No. 4, Nov. 2000, pp. 666-670.

Rozzi, J. C. et al., "Transient, Three-Dimensional Heat Transfer Model for the Laser Assisted Machining of Silicon Nitride: I. Comparison of Predictions With Measured Surface Temperature Histories," *International Journal of Heat and Mass Transfer*, vol. 43, No. 8, Apr. 15, 2000, pp. 1409-1424.

Shin, Y. C. et al., "Laser-Assisted Machining: Its Potential and Future," *Machining Technology*, vol. 11, No. 3, Third Quarter 2000, pp. 1-7.

Zhang, C. et al., "A Novel Laser-Assisted Truing and Dressing Technique for Vitrified CBN Wheels," *International Journal of Machine Tools and Manufacture*, vol. 42, No. 7, May 2002, pp. 825-835.

"Laser Aided Manufacturing Processes Lab," [online], © 2003, University of Missouri-Rolla. Retrieved from the Internet: http://web.mst.edu/~lamp/.

"Laser Aided Material Deposition Process," [online], © 2003, University of Missouri-Rolla. Retrieved from the Internet: http://web.mst.edu/~lamp/laserprocess.shtml.

Office Action dated Mar. 25, 2010, in U.S. Appl. No. 11/517,543 (18 pgs).

Office Action dated Nov. 9, 2010, in U.S. Appl. No. 11/517,543 (15 pgs).

* cited by examiner

INTEGRATED LASER MATERIAL PROCESSING CELL

CROSS-REFERENCE TO RELATED APPLICATIONS

This application claims the benefit of U.S. Provisional Patent Application Ser. No. 60/851,165, filed Oct. 12, 2006, which application is hereby incorporated by reference.

BACKGROUND OF THE INVENTION

The present invention generally relates to laser-assisted material processing, and more particularly to systems and methods for performing laser-assisted machining and directed material deposition.

Laser-assisted machining is typically used to enhance the machinability of difficult-to-machine materials by softening the material prior to removing it with a conventional cutting tool. The material is typically softened by locally elevating the temperature of the material with heat from the beam of a laser that is focused immediately ahead of the cutting tool. Laser-assisted machining typically prolongs tool life, improves surface finish, and increases material removal rates with reduced cutting forces.

Directed material deposition systems typically utilize a laser beam and material deposition nozzle guided by solid modeling computer software to fabricate freeform parts from layers of solidified powdered material. Each layer of a part is formed by the laser beam and material deposition nozzle making a number of passes over a substrate and thereby depositing an amount of powdered material which is subsequently melted and solidified into a single piece with heat from the laser beam. The layer height and number and type of passes can be varied depending upon characteristics of the part being made. For example, a number of "rough" passes that quickly deposit a thick layer of powdered material may maximize the build rate of the part, while "fine" passes that slowly deposit thinner layers of material may maximize dimensional accuracy of the part.

SUMMARY OF THE INVENTION

The integrated material processing cell of the present invention allows laser-assisted machining to be used in conjunction with directed material deposition in a single setup, achieving greater geometric accuracy and better surface finish than currently possible in existing laser freeform fabrication techniques.

One aspect of the present invention involves an integrated laser-assisted material processing cell having a multi-axis laser-assisted milling machine with a motor driven work spindle, a laser emitter, and means for positioning the laser emitter with respect to the work spindle so as to direct a laser beam onto a localized area of a workpiece in proximity to the cutting edge of a tool mounted in the work spindle. A powder delivery nozzle is mounted on the multi-axis machine and is positioned adjacent the laser emitter to deliver powder to a deposition zone in the path of the laser beam so that material deposition and laser-assisted milling may be performed substantially simultaneously in a single workspace.

Another aspect of the present invention involves a laser-assisted material processing cell having first and second mounting surfaces that are independently vertically movable, and independently horizontally movable along a common horizontal axis. A motor driven work spindle is mounted to the first mounting surface and a laser emitter is mounted to the second mounting surface, with the laser emitter being rotatable in a vertical plane. A third mounting surface that is movable in perpendicular relation to the horizontal axis.

A further aspect of the present invention involves a process for integrating laser-assisted machining with directed material deposition. The process positions a primary laser emitter within a workspace and positions a powder delivery nozzle within the workspace, adjacent the primary laser emitter. Powdered material is delivered through the nozzle onto a substrate within said workspace and is melted into a solidified layer with heat from a laser beam emitted from the primary laser emitter. A cutting tool is positioned within the workspace, over the substrate and adjacent the solidified layer. A secondary laser emitter is positioned within the workspace and adjacent the cutting tool. The solidified layer adjacent the cutting tool is heated with heat from a laser beam emitted from the secondary laser emitter to a temperature that facilitates material removal with the cutting tool. Material is cut from the solidified layer with the cutting tool.

BRIEF DESCRIPTION OF THE DRAWINGS

FIG. 3 illustrates operation of the setup of FIG. 2a.

DETAILED DESCRIPTION OF THE PREFERRED EMBODIMENT

Figure 1:
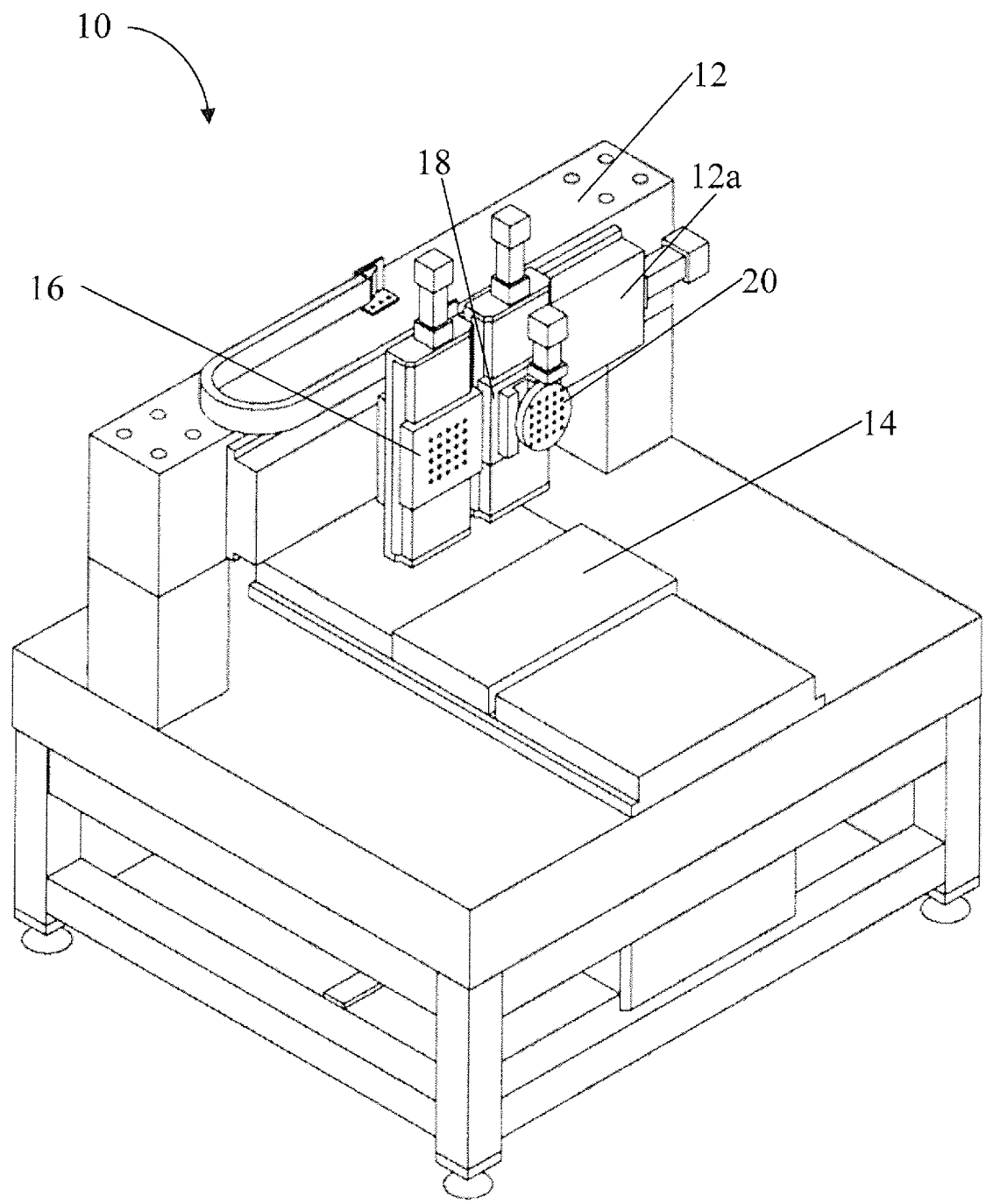
FIG. 1 is a perspective view of an integrated laser material processing cell according to the present invention.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

FIG. 1 shows the preferred embodiment of an integrated laser material processing cell 10 according to the present invention, utilizing a five-axis gantry system with integrated controller for performing multiple laser-based manufacturing processes. The cell is capable of building freeform structures from various materials with laser deposition, machining various internal and external features of the structures with laser-assisted machining or other machining, and selectively heat treating desired surfaces of the structures with laser heat treating, all in a single setup.

The processing cell generally comprises an x-axis gantry 12 holding a linear-sliding stage 12a over a table-mounted y-axis linear-sliding stage 14 (mounting surface) that has two independent z-axes linear stages 16 and 18 (mounting surfaces) slidably-mounted on the gantry stage, one of which 18 has a rotary-axis rotary stage 20 (mounting surface). The linear stages and rotary stage used to build the cell shown in FIG. 1 are commercially available from Aerotech, Inc. of Pittsburgh, Pa. Other structural configurations of the integrated laser material processing cell are also contemplated within the scope of the present invention however, such as, for example, incorporating the cell's x-axis movement into the table, and/or incorporating rotary movement into the cell's table. Although not preferred, in certain applications, it may be suitable to have laser deposition and laser-assisted machining performed at separate locations up to several feet apart on the same machine, with the part under construction moved between the two locations.

Figure 2A:
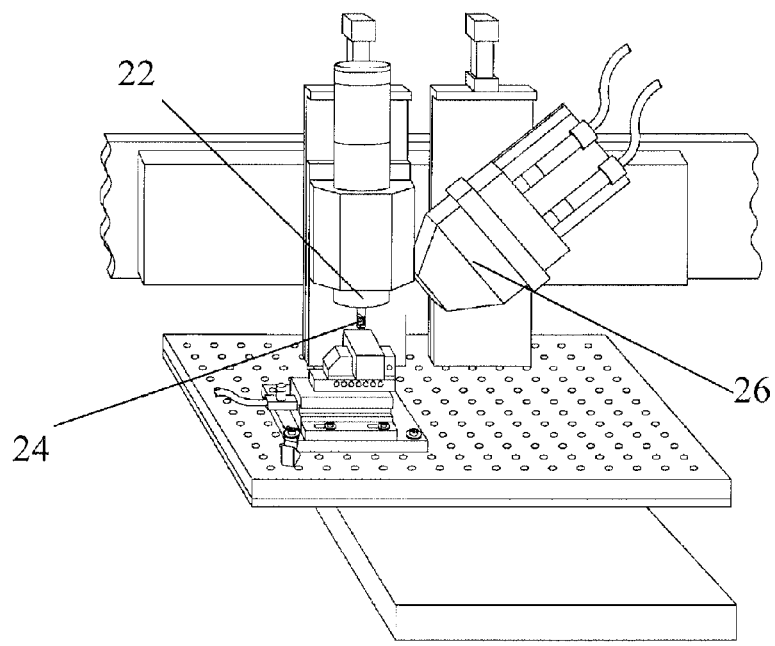
FIGS. 2a and 2b show the cell of FIG. 1 setup to perform a laser-assisted machining process.
Figure 2B:
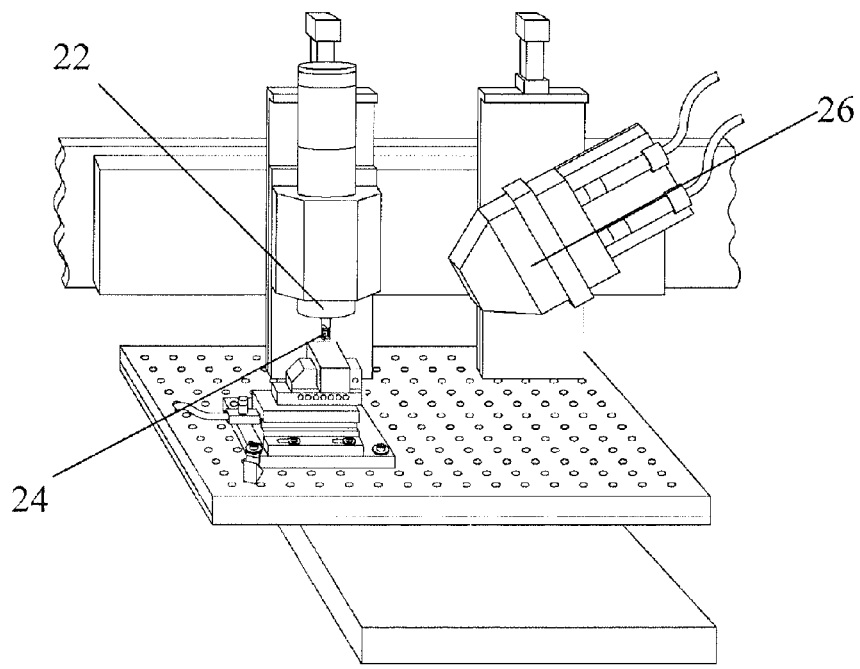
Figure 3:
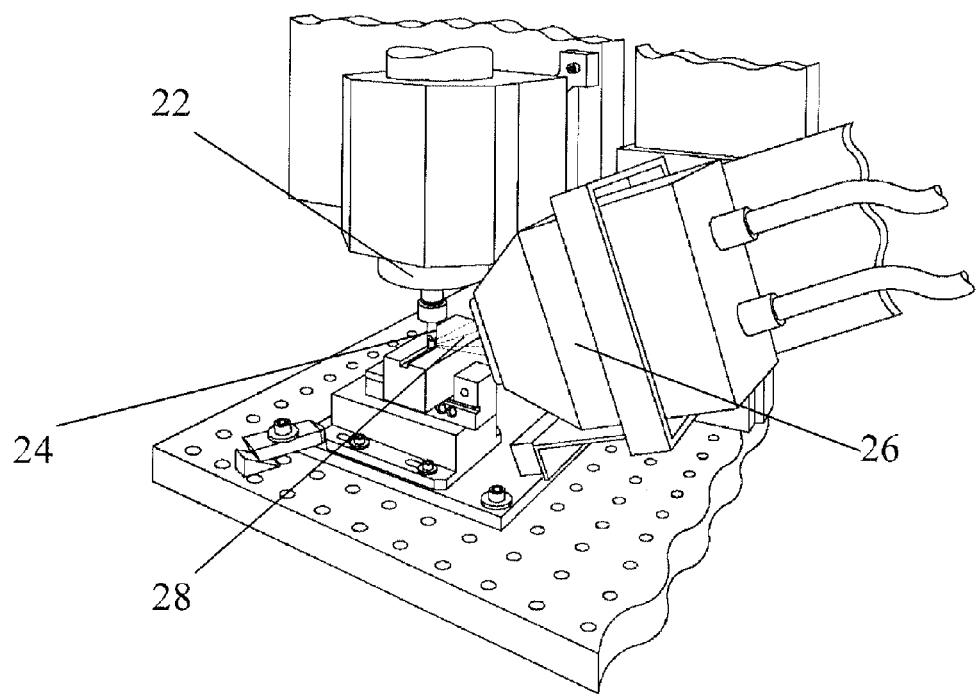

One application of the cell involves utilizing the flexibility of the two independent z-axes to perform laser-assisted machining using a high-speed motor-driven work spindle 22 (spindle) with cutting tool 24 and a high-powered primary laser emitter 26 (laser), as shown in FIGS. 2a-3. The two z-axes stages and associated rotary stage allow the spindle and primary laser to be independently moved along (carried by) the x-axis, such that the distance between them may be varied according to the parameters associated with a particular laser-assisted machining process. For example, the primary laser may need to be positioned closely to the spindle (FIG. 2a), with a small amount of primary laser rotation, so that its focus spot 28 may be positioned close to the cutting action of the cutting tool (FIG. 3), such as when the temperature of the workpiece material must be maintained at a high level, for example. On the other hand, the primary laser may need to be positioned further away (FIG. 2b) when the parameters so dictate.

Figure 4:
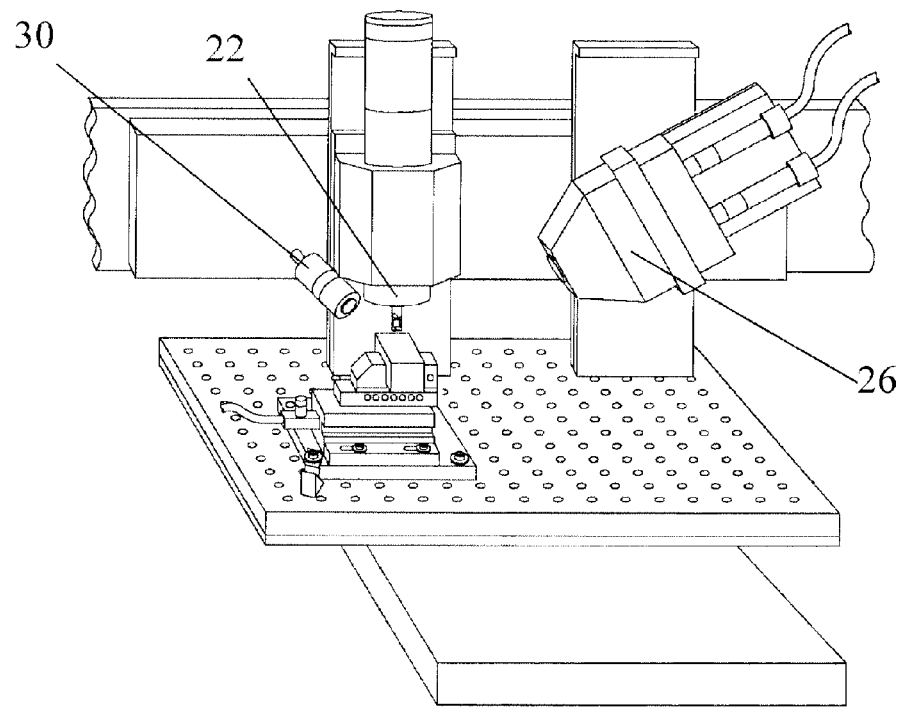
FIG. 4 shows the cell of FIG. 1 setup to perform a laser-assisted machining process with multiple distributed lasers.
Figure 5:
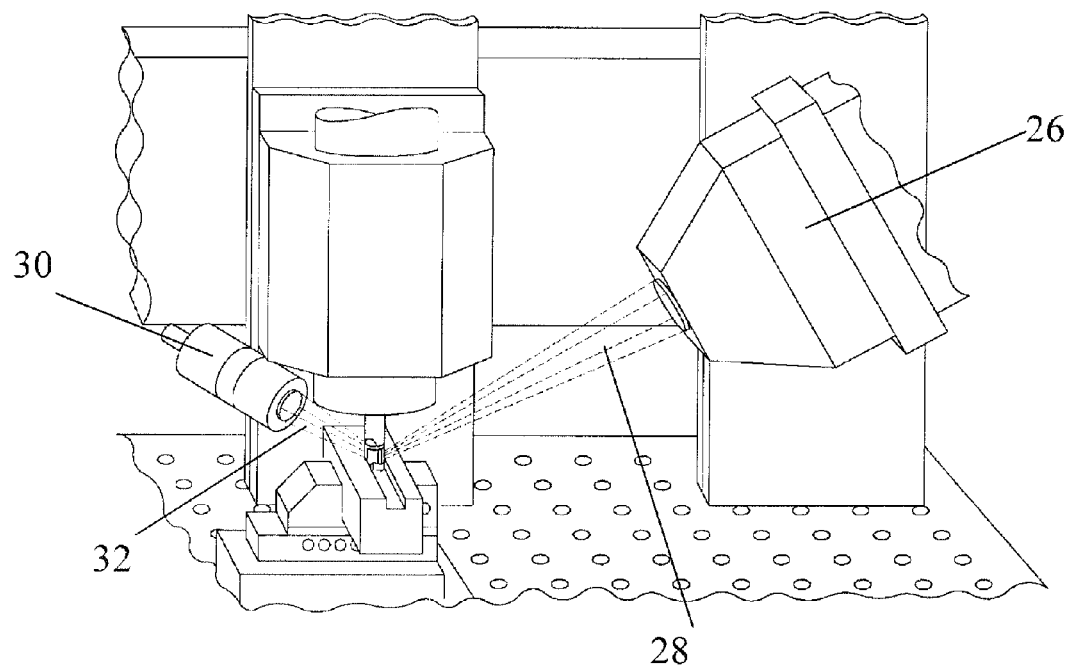
FIG. 5 illustrates operation of the setup of FIG. 4.

FIG. 4 shows that an additional, secondary laser emitter 30 (laser) may be mounted on the side of spindle 22 in certain applications so that the cell may be used to perform laser-assisted machining processes with multiple distributed lasers, such as the example shown in FIG. 5 where the secondary laser's focus spot 32 is used to maintain an elevated workpiece material temperature in closer proximity to the cutting tool than the primary laser focus spot.

Another application of the cell involves utilizing a side-feed material deposition nozzle 34 (FIGS. 6-8) to integrate directed material deposition with laser-assisted machining in the same workspace (FIG. 6), taking advantage of their common use of laser beam heat to process materials. The integration of these processes within a cell such as cell 10 facilitates building freeform parts from difficult-to-machine materials, such as ceramics, high temperature alloys and composites, that require laser-assisted machining to finish manufacture of parts.

Figure 7:
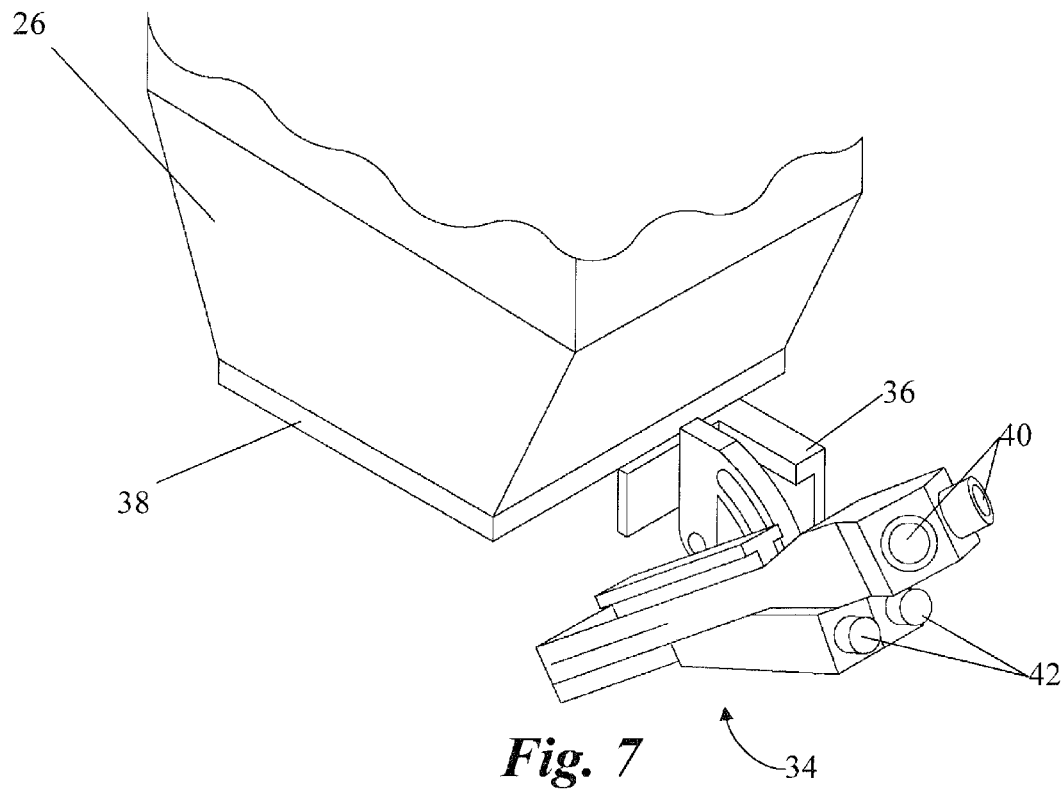
FIGS. 7 and 8 show detail of the side-feed material deposition nozzle shown in FIG. 6.
Figure 8:
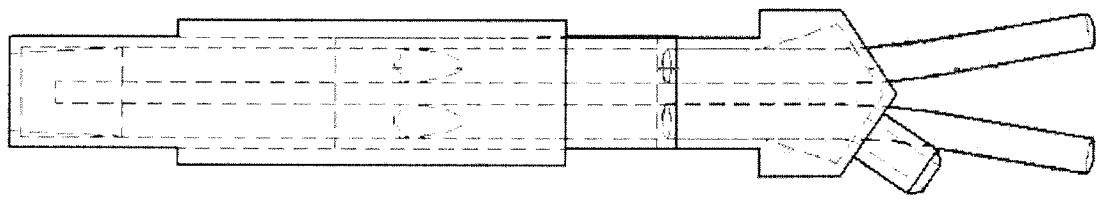

FIGS. 7 and 8 show detail of the side-feed deposition nozzle 34, mounted on the side of the primary laser 26 by nozzle support arm 36, which in turn is mounted on mounting ring 38. The primary laser has a shield gas manifold and nozzle (not shown) that are used to flood the workspace area with inert gas that protects the optics of the primary laser and prevents particulates from ambient air adjacent the cell from interacting with the material processing. U.S. Pat. No. 5,837,960 to Lewis et al., hereby incorporated by reference, discloses apparatus and methods used to isolate the workspace from the surrounding environment. The nozzle may have one or more powder inlets 40 for receiving material powder fed by a conventional material feeder (not shown) and water-cooling channels 42 for cooling the nozzle during deposition of materials. The system is capable of building functionally graded compositions of materials within a part and allowing control of material density and porosity.

Referring back to FIG. 6, the cell according to the present invention allows the relationships between the cutting tool 24, primary laser 26 and deposition nozzle 34 to be adjusted depending upon properties of the materials being used and the desired characteristics of the part being processed. For example, the spacing between the spindle and primary laser may be changed by manipulating the distance between the two z-axis stages, along the x-axis gantry, to achieve a desirable material temperature needed for laser-assisted machining immediately following directed material deposition.

Figure 6:
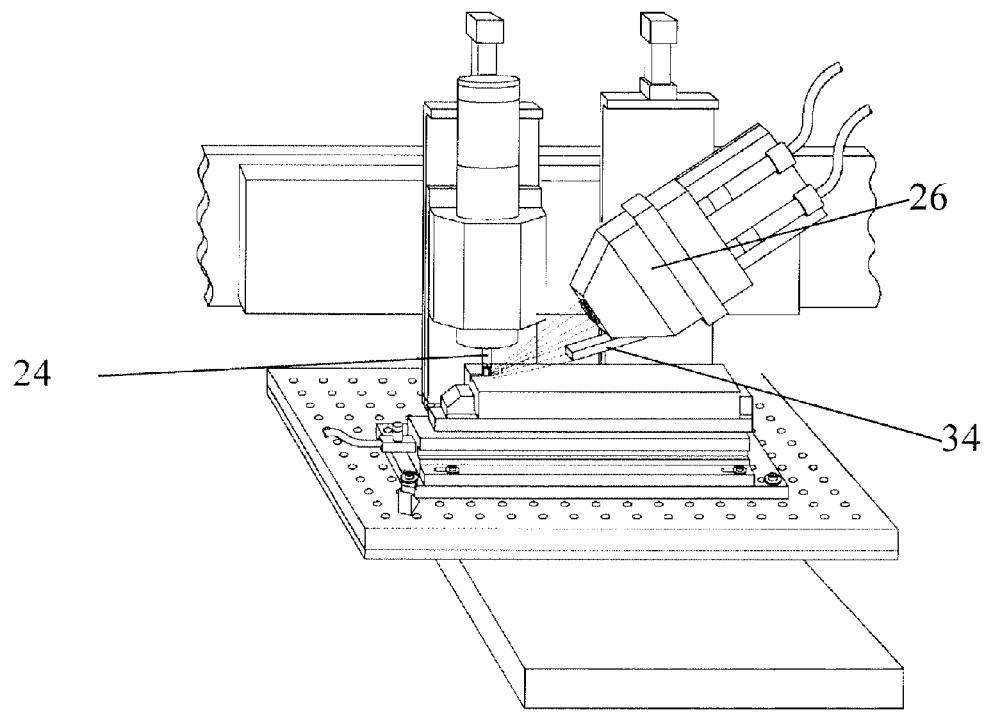
FIG. 6 shows the cell of FIG. 1 setup to combine directed material deposition with laser-assisted machining.
Figure 9:
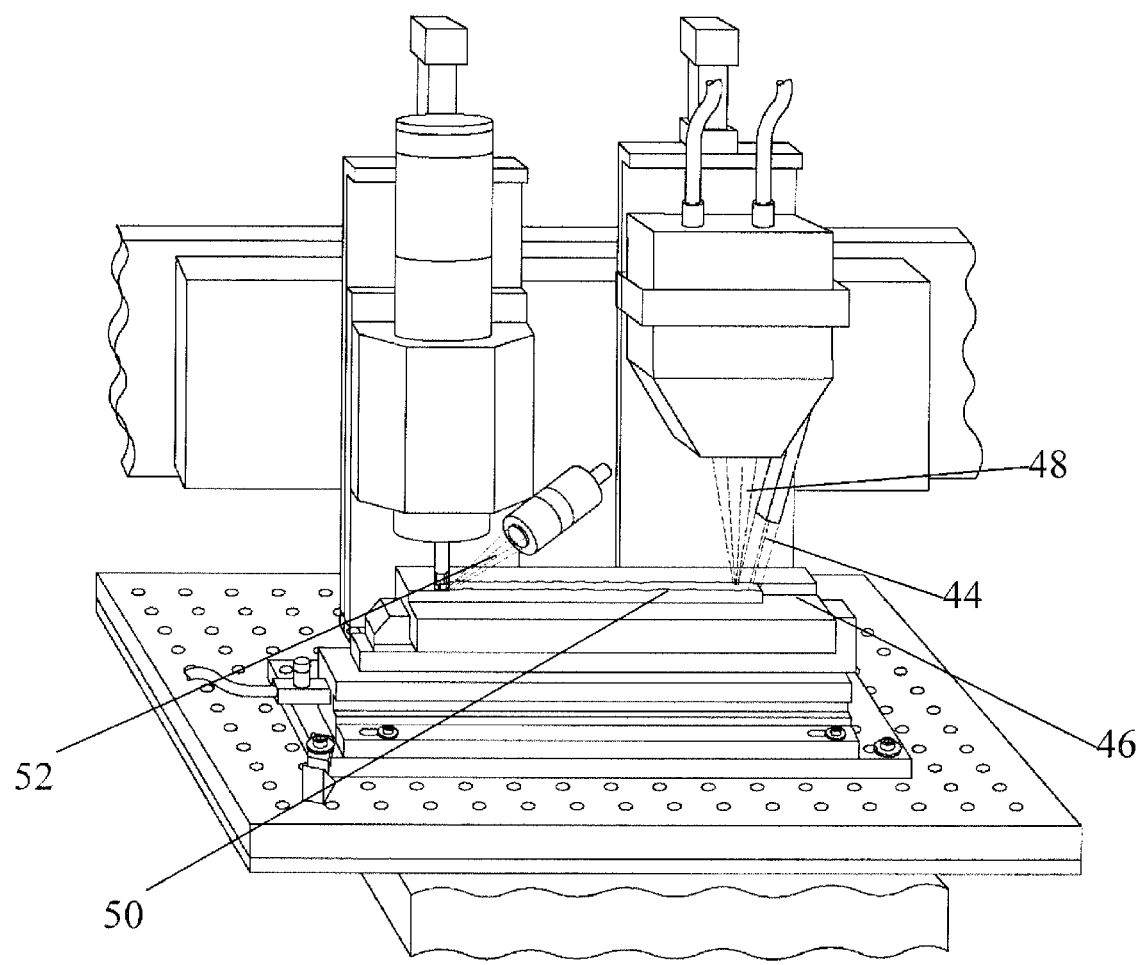
FIG. 9 illustrates operation of the setup of FIG. 6.

FIG. 9 shows how the cell setup of FIG. 6 is preferably operated. The side-feed deposition nozzle feeds a stream of material powder 44 onto substrate 46 as laser focus spot 48 of the primary laser melts material powder into a solid layer 50. The solidified layer may then be reheated, in certain applications, by laser focus spot 52 of a secondary laser to attain a desirable material temperature for a cutting tool to remove material from the surface of the solid layer. Closely following the deposition of material with a cutting tool allows the build rate of the part to be maximized with increased material deposition feed rates, while simultaneously increasing the geometric accuracy and surface finish of the part with the machining capabilities of a cutting tool.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A process for integrating laser-assisted machining with directed material deposition, comprising:
   positioning a primary laser emitter within a workspace;
   positioning a powder delivery nozzle within said workspace and adjacent said primary laser emitter;
   delivering powdered material through said nozzle onto a substrate within said workspace;
   melting said material into a solidified layer with heat from a laser beam emitted from said primary laser emitter;
   positioning a cutting tool within said workspace, over said substrate and adjacent said solidified layer;
   positioning a secondary laser emitter within said workspace and adjacent said cutting tool;
   heating said solidified layer adjacent said cutting tool with heat from a laser beam emitted from said secondary laser emitter to a temperature that facilitates material removal with said cutting tool; and
   cutting material from said solidified layer with said cutting tool;
   wherein said melting and cutting are performed substantially simultaneously.

2. The process of claim 1, wherein said heating incorporates heat retained by said solidified layer during said melting.

3. The process of claim 1, wherein said powder delivery nozzle is a side-feeding nozzle.

4. The process of claim 1, wherein said powder delivery nozzle has a plurality of inlets that mixes powder from a corresponding plurality of powder feeders.

5. The process of claim 1, wherein said powder delivery nozzle is mounted to said primary laser emitter.

* * * * *